NOISE LIMITER AND SIGNAL LEVEL CONTROL FOR ELECTRONIC AMPLIFIERS

Filed Aug. 13, 1962

2 Sheets-Sheet 1

INVENTOR.
Robert M. Grodinsky
Chauncey Richard Evans

BY Otto A. Earl

ATTORNEY.

INVENTOR.
Robert M. Grodinsky
Chauncey Richard Evans
BY. Otto A. Earl
ATTORNEY

United States Patent Office 3,278,672
Patented Oct. 11, 1966

3,278,672
NOISE LIMITER AND SIGNAL LEVEL CONTROL FOR ELECTRONIC AMPLIFIERS

Robert M. Grodinsky, Chicago, Ill., and Chauncey Richard Evans, Kalamazoo, Mich., assignors to Gibson, Inc., Kalamazoo, Mich.

Filed Aug. 13, 1962, Ser. No. 216,446
15 Claims. (Cl. 84—1.27)

This invention relates to a noise limiter and signal level control and circuit for electronic amplifiers. The principal objects of this invention are:

First, to provide an automatically operative control or regulator which may be applied to the electronic amplifier of an electronically reproducing musical instrument to limit the output of the amplifier to the capacity of the reproducing loud speaker or limit the production of undesired background noise by the amplifier.

Second, to provide an automatic control circuit for the amplifier of an electronically reproducing musical instrument which will permit the amplifier to be turned on in operative condition without producing any undesired background noise from the amplifier when the instrument is not being played.

Third, to provide a control circuit for the amplifying system of an electronically reproducing musical instrument which will proportionately compress or reduce the magnitude of desired input tone signals and undesired background signals prior to amplification and or introduction of tone modulating signals having inherent objectionable noise properties and thereafter increase or expand the magnitude of desired tone signals and unwanted background or induced signals in proportion to their strength prior to reproduction by the loud speaker so that the noise to signal ratio is very low.

Fourth, to provide a novel arrangement of a light sensitive resistor and associated light source for regulating the level of the signal in an amplifier in response to the signal input or output of the amplifier with a novel gate circuit connected in series with the light so that the light and resistor respond instantaneously to control signals created by minimum or maximum signals in the amplifier but are not affected by normal tone signals within the range which is desired to be amplified and reproduced.

Fifth, to provide a novel form of control having a light sensitive resistor which will permit the light and resistor to respond instantaneously to any applied signal but which will immediately limit the action of the light and resistor under the influence of prolonged signals.

Other objects and advantages of the invention will be apparent from a consideration of the following description and claims. The drawings, of which there are two sheets, illustrate a highly practical application of the amplifier control system of the invention as applied to limiting the maximum output of the amplifier, compressing the signal applied to an amplifier and re-expanding the signal ratio, and for providing an automatic shut-off of the output of an amplifier when no signal is applied thereto.

FIG. 1 is a schematic diagram of an electronically amplified and reproduced musical instrument such as a guitar with the amplifier control circuit of the invention applied thereto in output limiting relation.

FIG. 2 is a schematic diagram of the amplifier control circuit of the invention applied to the amplifying system of an electronically amplified and reproducing musical instrument to first compress the input signal to the amplifier prior to modification of the signal in the amplifier and then expand or re-establish the signal produced by the amplifier so that the tone modifying circuit or the amplifier may be operated at a level which will produce a minimum of background or unwanted sounds in the reproducer.

Figure 1:
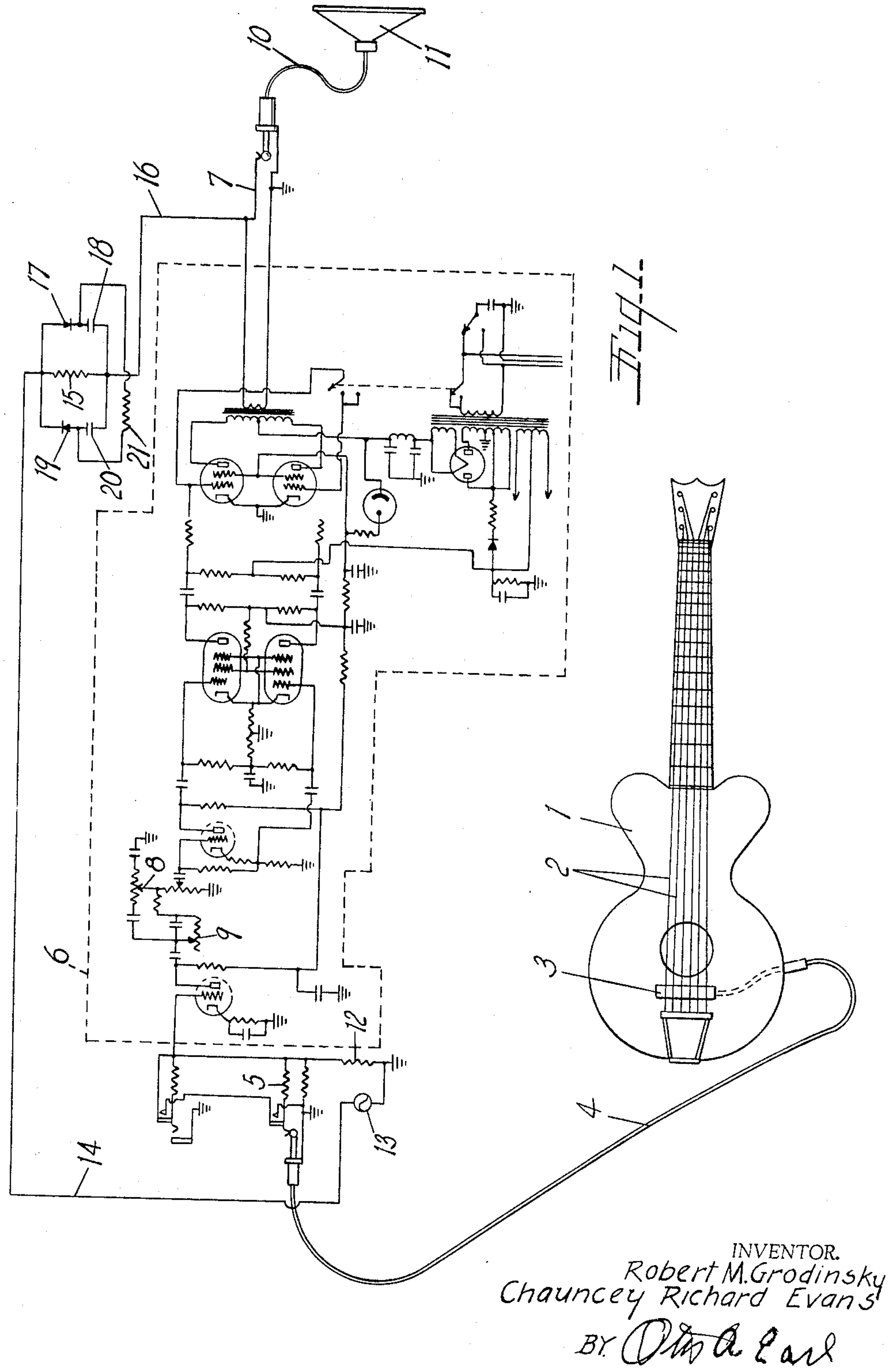

FIG. 1 illustrates a musical instrument designed to produce electrical signals corresponding to the musical tone of the instrument and amplify the tone signals to operate a reproducing loud speaker for the production of musical sounds corresponding to the tone developed by the instrument. By way of example, the musical instrument may be an electric guitar 1 having strings 2 which activate a magnetic pick-up 3 in a well known manner. The tone signal is conducted by the cable 4 to the input resistor 5 of an electronic amplifier enclosed within the dotted line 6. The amplifier 6 may be of various designs and connections arranged to produce an amplified tone signal in the output circuit 7 and no claim of novelty is made to the amplifier circuit per se. By way of explanation the variable resistor 8 is a treble tone control and the variable resistor 9 is a bass tone control. The output circuit 7 of the amplifier is normally connected through the cable 10 to a loud speaker 11.

It is well known that electronic amplifiers 6 may be designed and built with sufficient power and output to drive the loud speaker 11 beyond the capacity of the loud speaker to properly reproduce or transduce the electric guitar may create peak signals of greater amplitude than signal into sound. Also an instrument such as an electric the ability of an amplifier to amplify without distortion. Various means have been devised for limiting the output signal in the output circuit 7. The present invention provides a novel and inexpensive output limiting circuit for the amplifier to prevent overdriving both the loudspeaker and the amplifier.

Connected to the input circuit 5 and extending to ground is a light sensitive resistor 12 such as a cadmium sulphide cell with an activating lamp 13 mechanically and optically associated therewith. The lamp 13 is connected from ground through the conductor 14 and voltage limiting resistor 15 to the output circuit 7 of the amplifier. The characteristics of the light sensitive resistor 12 are such that it will change resistance practically instantaneously from an infinite resistance of hundreds of megohms when the lamp 13 is dark to a relatively small resistance of a few hundred ohms when the lamp 13 is lighted as by a voltage of 16 volts. It will be readily apparent that when a low signal is applied to the input 5 the high value of the resistor 12 will block the passage of any substantial current to ground and substantially the entire input signal will be amplified by the amplifier 6 to appear at the output 7 and drive the speaker 11. As the amplified signal in the output 7 increases in volume in response to louder input signals the output signal is sampled and conducted in part through the conductor 16, resistor 15 and conductor 14 to the lamp 13 causing the lamp to light and the resistance of the light sensitive resistor 12 to drop materially. This causes a variable proportion of the input signal to be by-passed to ground thus limiting the amplified output signal in the output circuit 7. In order to prevent the signal sampled by the conductor 16 from over-energizing the lamp 13 and blocking all output signals, the voltage dropping resistor 15 is provided in the lamp circuit.

There is an appreciable time delay between the development of a controlling signal in the sampling conductor 16 and the lighting of the lamp 13 through the resistor 15. This means that without further structure the initial increment of a loud signal caused by the musical plucking of the strings 2 with great energy would pass the output circuit 7 in amplified magnitude before the circuit 13–14–15–16 could block the loud signal and the circuit would have the undesirable effect of reproducing the initial phase of a tone loudly and then rapidly reducing or attenuating the tone. It is accordingly necessary to eliminate the effect of the voltage dropping resistor 15 during the initial phase of the developed tone and output signal. This is accomplished by providing a first one way diode 17 and series condenser 18 in parallel around the resistor 15. As the condenser 18 which may be of the order of 200 microfarads is charged by the initial phase of the control signal the condenser and diode act as a low resistance by-passing around the resistor with the result that the lamp 13 and light sensitive resistor 12 respond instantaneously and commence to limit the input and output of the amplifier. As the condenser 18 becomes charged it becomes non-conductive, and the resistor 15 functions to limit the energization of the lamp 13.

The by-pass condenser 18 and diode 17 function in one direction of current flow only so that one-half of the oscillating signal would be eliminated as a controlling factor for the lamp 13. Consequently an oppositely conductive diode 19 and condenser 20 are provided in series around the limiting resistor 15. The resistor 15 and by-pass circuits 17 to 20 thus function as a gate to pass the initial phase of an output signal and thereafter limit the magnitude of subsequent phases of the signal.

Since the control circuit is required to limit the signal of successive musical tones that are spaced in time it would be undesirable to leave the by-pass circuits 17, 18 and 19, 20 charged and non-conductive at the time when a second peak signal was developed in the output circuit 7. Consequently a leakage resistor 21 is provided between the condensers 18 and 20 to neutralize or leak off the charges on the condensers to recondition the by-pass circuits for regulating peak voltage outputs in the output circuit 7.

Figures 2, 3, 4, 5:
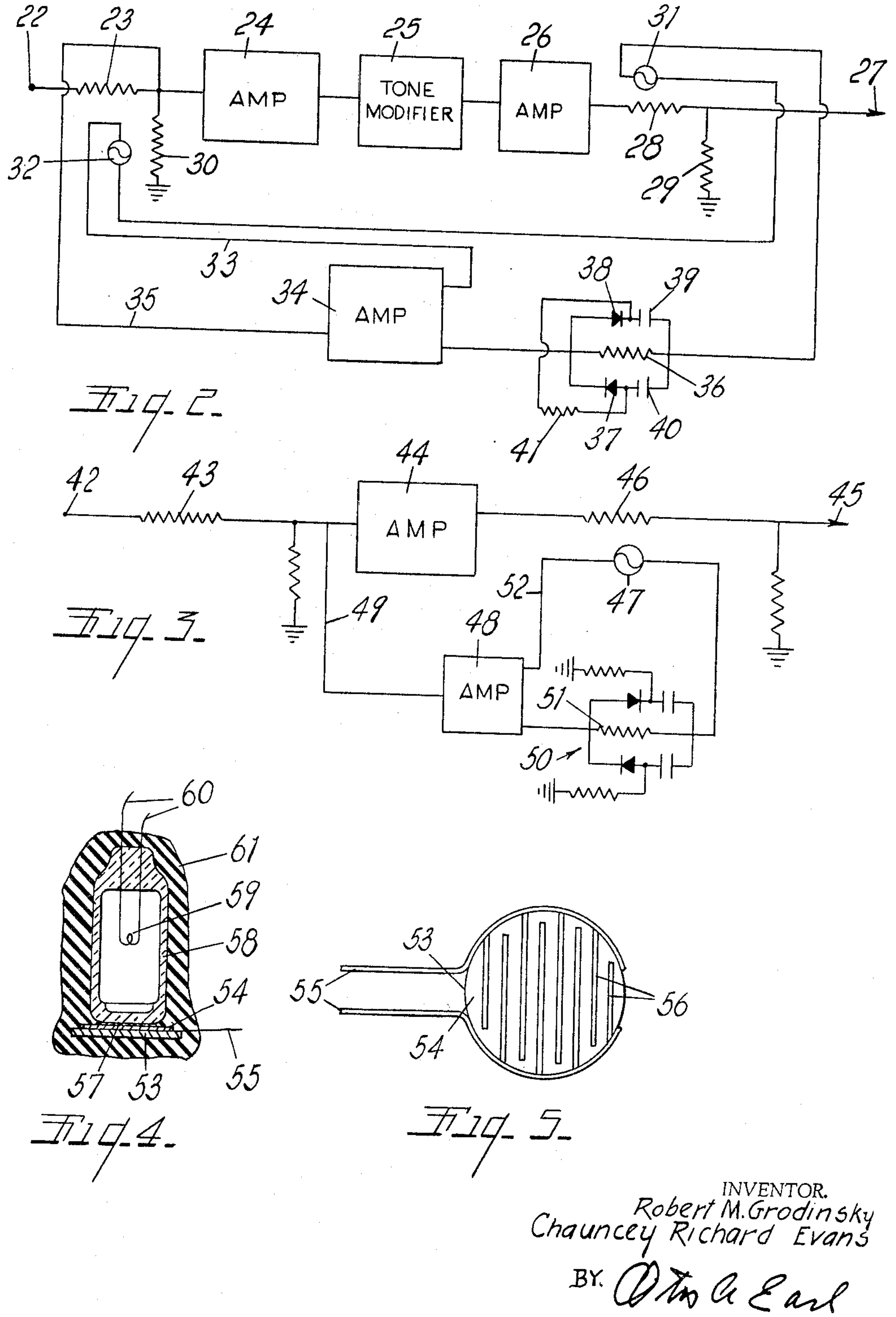
FIG. 3 is a schematic diagram of the tone control system of the invention applied to the amplifier of an electronically amplifying and reproducing musical instrument to reduce the output of the amplifier when no input signal is applied thereto and prevent reproduction or emission of the undesired background sounds from the amplifier when there is no musical tone to cover it up.
FIG. 4 is a cross sectional view through the light sensitive resistor and actuating lamp used in the several circuits of the invention.
FIG. 5 is a plan view of the light sensitive resistor used in the circuits of the invention.

A variation of the control circuit for the amplifier of a musical instrument is shown in FIG. 2 in which 22 indicates the input from the instrument delivering through a balancing resistor 23 to a first amplifier 24. The first stage amplifier 24 feeds or drives a tone modifying circuit 25 such as a vibrato reverberator circuit. Modifying circuits of this type are well known and so are not disclosed in detail. They have an undesirable characteristic of creating unwanted background signals or noise which is delivered with the desired signal to a second stage amplifier 26 so that both wanted and unwanted signals are delivered at amplified levels to the output 27.

In order to improve the noise to signal ratio of the amplifying and modifying circuit, a first light sensitive resistor 28 is connected in series in the output 27 ahead of a grounding resistor 29 and a second light sensitive resistor 30 is connected to ground from the balancing resistor 23 ahead of the first stage amplifier 24. Actuating lamps 31 and 32 are provided for the resistors 28 and 30 respectively. The lamps are connected in series by the conductor 33 to a control amplifier 34 to provide the necessary current and voltage activating the lamps. A parallel connection from the amplifier to the lamps would also function satisfactorily. The amplifier 34 is controlled by a control circuit 35 which samples or responds to the input signal ahead of the first stage amplifier 24. In order for the control signal from the amplifier 34 to the lamps 31 and 32 to respond immediately and within the desired levels or magnitude, a limiting resistor 36 similar in function to the previously described resistor 15 is connected in the lamp energizing circuit and a by-pass gate circuit consisting of the oppositely conductive diodes 37 and 38 in the capacitors 39 and 40 is connected around the resistor 36. A leakage resistor 41 is connected between the conductors as in the first form of the gate.

With the circuit shown in FIG. 2 the peaks or maximum voltages applied to the input 22 activate the amplifier 34 to energize the lamps 31 and 32 with the result that the resistor 30 is rendered more conductive and the amplitude of the peak input is reduced. Minimum or lower amplitude input signals are likewise reduced but to a lesser degree resulting in a compression of the input signal. That is, the envelope of the input signal applied to the first stage amplifier is narrower with less difference between its minimum and maximum amplitudes.

This compressed input signal is amplified by the first stage amplifier and acted upon by the tone modifying circuit 25. The tone modifying circuit may be operated at an amplitude where its undesired noise factor is at a minimum and is less than the lower amplitudes of the signal to be modified. Even the lower signals accordingly override the noise of the modifier and the compressed and modified signal is then further amplified by the second stage amplifier 26. The second stage amplifier 26 would normally amplify both the desired signal and the undesired background noise from the tone modifier in equal proportion and no advantage in signal to noise ratio would be obtained. However, the light sensitive resistor 28 in the output circuit is controlled by the lamp 31 and the amplifier 34 in response to the initial input signal as previously described to render the resistor 28 more conductive in response to peak portions of the input signal. This results in a reestablishment of the difference between minimums and maximums in the input signal or expansion of the modified and amplified signal in response to the input signal. The undesired noise signals remain in the signal envelope but are at a greatly reduced level as compared to the expanded or increased amplitude of the desired input signal.

With the circuit shown in FIG. 2 it is practical to employ amplifiers or tone modifying circuits or both at optimum levels and still produce an output signal with an improved noise to signal ratio by compressing the input signal prior to the introduction of any unwanted background noise signals and the reexpanding the output signal in response to the variation of the initial input tone signal.

FIG. 3 conventionally illustrates a third variation or use of the amplifier control circuit. In this arrangement the input signal from the musical instrument is applied to the input connection 42 and through the balancing resistor 43 to the amplifier 44. The output from the amplifier is conducted to the output connection 45 to the loud speaker. This is a standard amplifier circuit which functions satisfactorily to amplify the tone signal from the instrument and reproduce the signal in a loud speaker so long as the amplifier 44 is energized and operative when the instrument is played. However, since all amplifiers create a certain amount of undesired noise or hum this hum is reproduced by the loud speaker and when the amplifier and loud speaker are left operating without actually playing the musical instrument the hum becomes readily audible and objectionable. It would be possible to turn off the amplifier when the instrument is not being played but this is impractical particularly when the instrument is to be played at frequent intermittent intervals. Also a certain amount of time is required for the amplifier to become fully operative after it is turned on.

In order to prevent the transmission and reproduction of the undesired amplifier hum when the instrument is not actually being played, there is provided a light sensitive resistor 46 in the output circuit 45 activated by a lamp 47. The necessary voltage and current for the lamp 47 is provided by a control amplifier 48 and the output of the amplifier is regulated in response to input signals from the musical instrument by a control circuit 49. A gate circuit 50 and limiting resistor 51 may be connected in series in the circuit 52 to the lamp as in prior examples of the invention.

With this arrangement the main amplifier 44 remains fully operative at all times. The control amplifier 48 remains actuated but is biased or regulated at zero or low level so long as the musical instrument is inoperative and does not create any input signal to the lamp 47. The lamp 47 thus remains dark and the light sensitive resistor 46 approaches infinite value so no output signal is delivered to the loud speaker from the main amplifier. However, any input signal from the musical instrument immediately renders the control amplifier 48 and lamp 47 operative to eliminate the effective resistance of the resistor 46 and the full output of the amplifier 44 modulated in response to the musical input signal is directed to the output 45 and the loud speaker.

FIGS. 4 and 5 illustrate a novel mechanical detail of the light sensitive resistor and activating lamp structure which make it inexpensive and expedient to apply to the electronic circuits illustrated. The light sensitive resistor consists of an insulating disc 53 with a coating 54 of light sensitive cadmium sulphide. A pair of conductors 55 are mechanically attached to opposite rims of the disc and oppositely extending spaced lines of conducting silver 56 extending from the wires creating a multiplicity of narrow accurately controlled resistance areas between the two wires. The disc 53 with the conducting areas 56 upwardly thereon is adhered as by a layer of transparent adhesive 57 to the flat end of a small lamp bulb 58. A filament 59 positioned in the bulb is connected to lead wires 60 extending exteriorly of the bulb and an outer retaining and enclosing body of plastic or synthetic rubber is formed around both the bulb and the disc as at 61 by molding or by dipping the bulb and disc in a bath of the cover material. The light bulb and light sensitive resistor are thus mechanically encapsulated for protection and for excluding all light from the light sensitive seal except the light developed in the filament 59 of the control lamp.

What is claimed as new is:

1. For an amplifying circuit for musical instruments and including an input connection, an amplifier and an output connection, a regulating circuit comprising a light sensitive variable resistor connected to said amplifying circuit in a position to vary the output of said amplifying circuit, a variable intensity light source positioned in close mechanical proximity to said variable resistor and in light transmitting relation thereto, an energizing circuit for said source connected to said amplifying circuit to be energized by the signal in said amplifying circuit and connected to said source to energize the source in response to the magnitude of the signal in the amplifying circuit, a current limiting resistor connected in series in said energizing circuit, a first path connected to opposite ends of said resistor, said first path consisting of a first diode and a first capacitor in series therewith, a second path connected to said opposite ends of said resistor, said second path consisting of a second diode and a second capacitor in series therewith, said first and second diodes being arranged in oppositely conductive relation, said first and second paths conducting freely around said current limiting resistance during the initial portion of a loud signal, to prevent lags in the energizing of the light source, and a charge leak path connected to said capacitors to dissipate the charges thereon.

2. The device defined in claim 1, in which the charge leak resistor is connected at one end between said first diode and said first capacitor and at the other end between said second diode and second capacitor.

3. The device defined in claim 1, in which the charge leak path comprises a pair of resistance paths connected to ground at one end thereof and connected to corresponding ones of said first and second paths between the capacitors and diodes thereof.

4. For an amplifying circuit for musical instruments and including an input connection, an amplifier and an output connection, a regulating circuit comprising a light sensitive variable resistor connected to said amplifying circuit in a position to vary the output of said amplifying circuit, a variable intensity light source positioned in light transmitting relation to said variable resistor, an energizing circuit for said source connected to the input of said amplifying circuit to be energized by the input signal in said amplifying circuit and connected to said source to energize the source in response to the magnitude of the input signal in the amplifying circuit, a control amplifier connected in series in said energizing circuit with one way conductive diodes and condensers connected in series with the control amplifier and in oppositely conductive relation in parallel with each other and with a limiting resistor, said limiting resistor being connected between said control amplifier and said light source, and a charge leak path connected to said condensers to dissipate the charges thereon.

5. For an amplifying circuit for musical instruments and including an input connection, an amplifier and an output connection, a regulating circuit comprising a light sensitive variable resistor connected to the output of said amplifying circuit in a position to vary the output of said amplifying circuit, a variable intensity light source positioned in light transmitting relation to said variable resistor, an energizing circuit for said source connected to said amplifying circuit to be energized by the signal in said amplifying circuit and connected to said source to energize the source in response to the magnitude of the signal in the amplifying circuit, and a control amplifier connected in series in said energizing circuit and current limiting resistance means for preventing overenergizing of said lamp, said means being connected between light sources and said control amplifier in said energizing circuit.

6. The device defined in claim 5 in which said energizing circuit is connected to the input of said amplifier for energization by the input signal to the amplifier and including means connected around the current limiting resistance for shorting same out during the initial portion of signals which would be delayed by said resistance from energizing said light source.

7. A noise limiting circuit for an electronically amplified and reproduced musical instrument having an amplifier with an input and an output to a speaker, said circuit comprising, a first light sensitive resistor connected between said input and ground, a second light sensitive resistor connected in series in said output and connected by a fixed resistor to ground, a pair of lamps positioned in light transmitting relation, one to each of said light sensitive resistors and electrically connected in series, a control amplifier having its output connected to the series circuit of said lamps, a control circuit connected from the input of said musical instrument amplifier ahead of said first light sensitive resistor to said control amplifier to regulate the control amplifier, and a current limiting resistor connected in series with said lamps with one way conductive diodes and condensers connected in oppositely conductive relation in parallel with each other and with said limiting resistor with a charge leakage path connected between the condensers.

8. A noise limiting circuit for an electronically amplified and reproduced musical instrument having an amplifier with an input and an output to a speaker, said circuit comprising, a first light sensitive resistor connected between said input and ground, a second light sensitive resistor connected in series in said output and connected by a fixed resistor to ground, a pair of lamps positioned in light transmitting relation, one to each of said light sensitive resistors, a control amplifier having its output connected to said lamps, a control circuit connected from the input of said first amplifier ahead of said first light sensitive resistor to said control amplifier to regulate the control amplifier, and a current limiting resistor connected in series with said lamps.

9. A noise limiting circuit for an electronically amplified and reproduced musical instrument having an input and an output to a speaker, said circuit comprising, a first amplifier connected to said input, a tone modifier connected to said first amplifier, a second amplifier connected between said tone modifier and said output, a first light sensitive resistor connected between said input and ground, a second light sensitive resistor connected in series in said output and connected by a fixed resistor to ground, a pair of lamps positioned in light transmitting relation, one to each of said light sensitive resistors and electrically connected in series, a control amplifier having its output connected to the series circuit of said lamps, a control circuit connected from the input of said first amplifier ahead of said first light sensitive resistor to said control amplifier to regulate the control amplifier, and a current limiting resistor connected in series with said lamps with one way conductive diodes and condensers connected in oppositely conductive relation in parallel with each other and with said limiting resistor with a charge leakage path connected between the condensers.

10. A noise limiting circuit for an electronically amplified and reproduced musical instrument having an input and an output to a speaker, said circuit comprising, a first amplifier connected to said input, a tone modifier connected to said first amplifier, a second amplifier connected between said tone modifier and said output, a first light sensitive resistor connected between said input and ground, a second light sensitive resistor connected in series in said output and connected by a fixed resistor to ground, a pair of lamps positioned in light transmitting relation, one to each of said light sensitive resistors, a control amplifier having its output connected to said lamps, a control circuit connected from the input of said first amplifier ahead of said first light sensitive resistor to said control amplifier to regulate the control amplifier, and current limiting resistor means connected in series with said lamps.

11. A noise limiting circuit for an electronically amplified and reproduced musical instrument having an input and an output to a speaker, said circuit comprising, a first amplifier connected to said input, a tone modifier connected to said first amplifier, a second amplifier connected between said tone modifier and said output, a first light sensitive resistor connected between said input and ground, a second light sensitive resistor connected in series in said output and connected by a fixed resistor to ground, a pair of lamps positioned in light transmitting relation, one to each of said light sensitive resistors, a control amplifier having its output connected to said lamps, and a control circuit connected from the input of said first amplifier ahead of said first light sensitive resistor to said control amplifier to regulate the control amplifier.

12. For the electronic amplifier and reproducer of a musical instrument, a circuit arranged to deenergize the reproducer when the amplifier is energized but when the instrument is not being played to prevent the production of background sound from the amplifier comprising, a light sensitive resistor connected in series with the output of said amplifier and connected through a second resistor to ground, a lamp positioned in light transmitting relation to said light sensitive resistor, a control amplifier having its output connected to said lamp to energize the lamp, and a control circuit connected to the input of said first amplifier and to the control amplifier to regulate the control amplifier in response to signals applied to the first amplifier, said control circuit having a voltage limiting resistor connected in series therein with one way conductive diodes and condensers connected in oppositely conductive relation in parallel with each other and with a charge leakage path connected between the condensers.

13. For the electronic amplifier and reproducer of a musical instrument, a circuit arranged to deenergize the reproducer when the amplifier is energized but when the instrument is not being played to prevent the production of background sound from the amplifier comprising, a light sensitive resistor connected in series with the output of said amplifier and connected through a second resistor to ground, a lamp positioned in light transmitting relation to said light sensitive resistor, and a control circuit connected to the input of said first amplifier and to said lamp to energize said lamp in response to signals applied to the first amplifier, said control circuit having a voltage limiting resistor connected in series therein.

14. A noise limiting circuit for an electronically amplified and reproduced musical instrument having an amplifier with an input and an output to a speaker, said circuit comprising:

a first light sensitive resistance means for compressing the input signal to said amplifier as a positive function of the light applied thereto, said first means being connected across said input;

second light sensitive resistance means for expanding the output of said amplifier as a positive function of the light applied thereto, said second means being connected in series with said speaker across said output;

a pair of lamps positioned in light transmitting relation, one to each of said light sensitive resistance means;

control means for energizing said lamps as a positive function of the input to said amplifier, said control means being connected from the input of said amplifier ahead of said first means;

said control means including a current limiting resistor connected in series with said lamps for preventing said lamps from overenergizing said light sensitive resistance means.

15. The device defined in claim 14, in which said second means is connected by a fixed resistor to ground so that a decrease in resistance thereof results in an increase in output therethrough.

References Cited by the Examiner

UNITED STATES PATENTS

| | | | |
|---|---|---|---|
| 1,011,824 | 12/1911 | Linder et al. | 338—15 |
| 1,510,476 | 10/1924 | Hammond | 84—1.16 |
| 1,690,224 | 11/1928 | Gent | 84—1.24 |
| 2,997,677 | 8/1961 | Lubin | 338—15 |
| 3,020,488 | 2/1962 | De Miranda et al. | 330—59 |
| 3,082,381 | 3/1963 | Morrill et al. | 330—59 |
| 3,087,120 | 4/1963 | Schoellhorn et al. | 330—59 |
| 3,167,722 | 1/1965 | Weller | 330—59 |

FOREIGN PATENTS

| | | |
|---|---|---|
| 653,099 | 5/1951 | Great Britain. |

ARTHUR GAUSS, *Primary Examiner.*

B. P. DAVIS, *Assistant Examiner.*

UNITED STATES PATENT OFFICE

CERTIFICATE OF CORRECTION

Patent No. 3,278,672 October 11, 1966

Robert M. Grodinsky et al.

It is hereby certified that error appears in the above numbered patent requiring correction and that the said Letters Patent should read as corrected below.

Column 2, line 40, beginning with "transduce the" strike out all to and including "without distortion." in line 43, same column 2, and insert instead -- transduce the electric signal into sound. Also an instrument such as an electric guitar may create peak signals of greater amplitude than the ability of an amplifier to amplify without distortion. --; column 8, line 64, after "therein" insert -- and means for shunting the initial portions of high amplitude signals around said limiting resistor to avoid lags in energizing said lamp --.

Signed and sealed this 5th day of September 1967.

(SEAL)
Attest:

ERNEST W. SWIDER
Attesting Officer

EDWARD J. BRENNER
Commissioner of Patents